Patented Dec. 30, 1930

1,786,831

UNITED STATES PATENT OFFICE

CHARLES E. DELLENBARGER, OF CHICAGO, ILLINOIS, ASSIGNOR TO PAUL CARPENTER, OF GLENVIEW, ILLINOIS

MODIFIED GUM AND ITS MANUFACTURE

No Drawing.   Application filed April 24, 1922.   Serial No. 556,333.

My present invention relates generally to the production of a modified gum, and more particularly to the association of two or more materials to form a composition which, while having the desirable characteristics of each of its components, lacks any of the undesirable characteristics of either thereof, and specifically to the production of a novel material having characteristics and functions hitherto not known.

While the materials produced, according to my present invention, have wide fields of utility in their various stages of production, for purposes of illustration I describe them in this specification, in connection first with their use at one stage as a composition suitable for coatings for certain purposes, and at another stage as bases for masticable products.

Paraffine and analogous substances have a number of desirable characteristics, among which are their inertness and neutrality. Because of these characteristics, the use of paraffine in connection with food-stuffs as sealing and coating means and generally for the purposes of keeping out moisture has been quite general, and the use of paraffine as a substitute for chewing gum has at times been attempted. Paraffine is, however, characterized by slight mechanical strength and small co-efficient of cohesion or adhesion. For this reason the use of paraffine has been limited. Substances such as rubber, however, which possess to a marked degree those characteristics absent from paraffine are themselves not available for various purposes, either because of the presence therein of certain undesired characteristics or the absence therefrom of certain desired characteristics.

Among the more important objects of my invention are the provision, as a new article of manufacture, of a gum-like substance possessing novel characteristics; the provision of a paraffine-like substance lacking certain marked defects of paraffine; the provision of a rubber-like substance having characteristics absent from rubber, and lacking characteristics present in rubber; the provision of a modified gum-like substance possessing certain selected characteristics of both paraffine and rubber; the provision of a gum-like substance so characterized but possessing certain additional characteristics present in neither paraffine nor rubber; the provision of an improved gum-like substance adapted for use as a coating for materials; the provision of an improved gum-like substance adapted for use as a vehicle for fatty materials; the provision of an inexpensive gum-like substance which may not only be used in lieu of more expensive material but which is susceptible of employment for purposes for which such more expensive materials are unavailable; and of improved processes for producing the same.

Chewing gums as generally manufactured at present have gum chicle as their base. The employment of this base is attended by the relatively high cost of the chicle, the necessity for its clarification and the inability of the gum so made to act satisfactory as a vehicle for carrying modifying elements such as chocolate.

Among other of the more important objects of my invention, therefore, are; the provision of an improved composition as a base for chewing gum; the provision of a chewing gum which will serve satisfactorily as a vehicle for various and unusual modifying elements; the provision of a chewing gum base whose characteristics can be standardized; the provision of a chewing gum base which will form a satisfactory vehicle for modifying elements such as chocolate; and the provision, generally, of a new, improved, more economically produced, easily worked, definitely determined, gum-like substance, and one characterized by greater purity and freedom from foreign matter and by greater susceptibility to precise modification in certain essential particulars than any other known to me, and of improved processes for producing the same; together with such further and additional objects as may hereinafter appear or be pointed out.

Paraffine has come into wide use for various purposes, such as for coating paper for protection against moisture, sealing preserves, jellies, and the like, against atmospheric contamination. Among the characteristics of paraffine that make it available for such uses as have been set forth above, and for other and similar uses, are its inertness and its neutrality both as to any inherent flavor or taste or as to any acquired one. Paraffine, furthermore, is easily obtainable and readily workable under ascertained thermal conditions. Paraffine is not available for some purposes and is inefficient for others because of the relatively small mechanical strength possessed by a mass thereof owing to the small co-efficient of cohesion between the particles of the mass, and further because of the small co-efficient of adhesion between masses thereof and certain other objects.

I have, however, discovered that by associating other substances in a manner which I will now describe that I can not only give to the resulting composition characteristics not possessed by paraffine itself but that the composition will lack certain undesired characteristics present either in the paraffine or in other constituents thereof.

Rubber, on the other hand, while deficient in characteristics which make paraffine particularly available for the uses to which it is put, does possess, however, qualities that are markedly absent in hydro-carbons such as those of the paraffine group. On the other hand, rubber is deficient in a number of characteristics which limit its use but which characteristics are found in selected hydro-carbons of the paraffine type.

In carrying out the successive stages of my present invention, I preferably employ a gummy substance such as rubber of a selected type, and a waxy substance such as a selected hydro-carbon of the paraffine group for the production of what I term my first intermediate; for the attainment of certain purposes I add another selected hydro-carbon which is preferably a neutral resene for the production of what I term my second intermediate; and for the attainment of certain further purposes I add still another hydro-carbon which may be an asphaltic base, or one of a number of organic materials for the production of what I term my third intermediate.

In the preferred practice of my invention, which as suggested involves a number of stages, certain of which involve in turn a plurality of steps, I form a batch of materials associated in a preferred manner which I will now proceed to describe, as the first stage of my improved process.

As an example of the batch, I may take 100 pounds of paraffine wax which may be of the standard commercial type derived from Pennsylvania crude petroleum. This may be conveniently melted in an open kettle at 118° C., which is an economical degree of heat to be employed. I then churn in 15 pounds to 20 pounds of rubber.

The weight of the rubber is pre-determined with reference to the use contemplated as will be more fully set forth hereinafter, for I have found the greater the amount of rubber employed by me the more resistant will be the resulting product.

The form of rubber employed by me is preferably thin Ceylon sheets, which I have found most desirable as they enter into my improved composition more rapidly than do Para and low-grade rubbers, which, however, may be used for certain purposes. Mass caoutchouc is not so desirable as is Ceylon, nor is smoked Para, inasmuch as these enter into the composition more slowly on the one hand, substantially lengthening the process, and on the other hand are not so free from taste as is desirable for certain objectives contemplated by me.

Furthermore, within my experience, sheets of rubber coagulated by the acetic process are preferable inasmuch as they give the best results.

Preparatorily to churning in, the thin Ceylon acetic acid coagulated sheets may be shredded by means of a small slitting machine such, for example, as is used for the production of confetti.

The churning in and intimate admixture of the materials may be effected by means of a mixing machine suitable for the purpose, such for example as one of the well-known Warner & Pfleiderer type. When this churning in is done in such an open kettle apparatus, steam heated to about 95° C., the resultant product is in the form of a hot spongy mass, wherein, despite the relatively small ratio of the rubber to the paraffine wax, such mass appears as if it were rubber which had absorbed the oil resulting from the melting of the wax. This completes the first stage of the process for the product thus produced may be used within my experience, immediately upon the disappearance of the unabsorbed or combined oil, that is when no free oil appears to be present in the heated machine, or may be used at some future convenient time.

In carrying out the second stage of the process, the spongy mass produced by the first stage is gradually raised to substantially 132° C., which I now deem to be the first critical temperature inasmuch as it is the point where liquefaction of the spongy mass and a change of its color begins. While this stage is being carried on, the rubbery mass appears partly to melt into a waxy substance and partly to be molten thereinto. This reaction proceeds slowly during this stage and the resultant product is a very stiff base suitable for the manufacture of material adapted for transportation to and use in tropical climates.

In my preferred practice, I continue to raise the temperature from 132° C. to 145° C.

and I have found in experience that this should be done quite gradually. The higher temperature noted renders possible a great uniformity in the product. The rise in temperature may be continued up to 165° C. or 170° C. or even higher, but above 145° C. much watchfulness must be employed to guard against oxidization. Furthermore, the gradual changes in temperature are most desirable, not only to avoid burning and to produce an even homogeneous mass, but, for certain purposes, to delete the distinctively rubber flavor, and attain a bland tasteless product and one having relatively slight resistance to the teeth.

This resultant product has now lost any rough fibrous nature and has taken on characteristics which make it available for different purposes. One of these characteristics for example, whose importance will appear as this specification is read, is masticability.

It should be borne in mind that the temperatures hereinabove set forth are those employed when the process is carried on at atmospheric pressure, and furthermore, that at this stage of the process both the ingredients have been so altered in their nature that in merging into a third stage they co-operate to produce a new product resembling closely neither rubber nor wax.

This new product is hot-short as well as relatively cold-short, and for the purpose of increasing tensile strength and where desirable materially increasing elongation, I gain these desirable attributes by the addition of a suitable resin.

Alternately to carrying out my improved process under atmospheric pressure, I find it quite expedient to employ closed containers for certain purposes. A pressure of two atmospheres may be employed, at which a temperature of between 110° C. and 115° C. enables me to produce results comparable with the employment of a temperature of 132° C. under atmospheric conditions.

The mass produced by the autoclave process requires tempering as set forth in this specification, since such cannot be avoided by the use of closed containers.

For certain purposes the open kettle process is preferable, inasmuch as I am thereby enabled to produce a relatively dry, tasteless product, whereas the use of steam or oil as is required in the autoclave process is objectionable because of the moisture incident to the use of steam, and the unavoidable oxidization of the oil incident to the relatively high heat, with resultant objectionable odor or flavor imparted to the products.

While such resultant product may, as above indicated, be masticated at the present stage, it is not, on the one hand, within the requirements of the market a commercial product for such purposes; on the other hand, it is peculiarly available as a material for sealing food-products against the entrance of atmospheric air, and as it appears to be chemically inert and resistant to acids and ferments it may be used as a lacquer for protecting metallic sheets and vessels of various materials against their action.

I have found that the attributes of masticability of the product thus produced can be utilized so that the product may be used as a base for commercial chewing gum to suit the several tastes and to meet varying climatic conditions and the requirements of the different markets by treating the product to what I term a tempering process. This tempering is effected with a certain type of base by the addition of resinous material such, for example, as gum Pontianac, ester gum, gum coumarin, Pontianac resin, or a neutral resene having a suitable melting point. Thus gum copal, gum kauri, gum dammar, gum mastic, and the like may be used.

The question of commercial use depends in part upon the relative price of rubber, paraffine, resinous material, and, where such is employed, the fat content.

This tempering, which relates to the production of chewing gum and the like, which is found in experience to require a material susceptible among other things of marked elongation, involves the third stage of my improved process.

As examples of formulæ for the production of suitable materials, I give the following, first noting that by the term "base" I refer to the material produced by the second stage of my process by the term "parts", proportions by weight. Thus:

|  | Parts |
|---|---|
| (1) Base, at 145° C | 100 |
| Ester gum | 20 |
| Coumarin | 1 |

Explanatorily of the foregoing, I may observe that coumarin has a low-temperature flow-point which aids in the incorporation of the ester gum in the mass and could be omitted if the mass were heated to 150° C., though I prefer to avoid such high temperatures inasmuch as they involve danger of oxidization.

|  | Parts |
|---|---|
| (2) Base, at 145° C | 100 |
| Ester gum | 10 |
| Coumarin | 3 |
| Beeswax | 5 |

|  | Parts |
|---|---|
| (3) Base, at 140° C | 100 |
| Ester gum | 5 |
| Coumarin | 5 |
| Neutral fat | 2 |

The neutral fat may be cocoanut fat, but it is to be noted that where an oxidizable fat is employed it should be kept under 5% in order to avoid any resultant rancidity.

| | | Parts |
|---|---|---|
| (4) | Base, at 140° C | 100 |
| | Beeswax | 5 |
| | Petrolatum | 3 |

| | | Parts |
|---|---|---|
| (5) | Base, at 145° C | 100 |
| | Gutta-K | 10 |

| | | Parts |
|---|---|---|
| (6) | Base, at 145° C | 100 |
| | Guttasiak | 8 |

| | | Parts |
|---|---|---|
| (7) | Base, at 150° C | 100 |
| | Purified Pontianac resin | 10 |

| | | Parts |
|---|---|---|
| (8) | Base, at 145° C | 100 |
| | Purified asphaltum at 220° C | 100 |

| | | Parts |
|---|---|---|
| (9) | Base, at 140° C | 100 |
| | Purified asphaltum at 200° C | 100 |

| | | Parts |
|---|---|---|
| (10) | Base, at 145° C | 100 |
| | Bordeaux pitch | 5 |

| | | Parts |
|---|---|---|
| (11) | Base, at 145° C | 100 |
| | Sweet-bay gum | 10 |

| | | Parts |
|---|---|---|
| (12) | Base, at 145° C | 100 |
| | "Guayule rubber" | 10 |

A portion of the gum or resene used for tempering may be introduced before the first churning or at any stage in the process, but I find it convenient and for a number of reasons preferable to add the entire amount at one time (instead of by increments), as at the third stage described.

It is to be particularly noted that at some stage of the process, which is conveniently and ordinarily subsequent to the steps thus far described, I preferably (though not necessarily) add a small amount of moisture, say approximately 2%, for the purpose of producing a mellowing and softening effect on the masticable gum when aged, thus rendering it more akin in its desirable functions, attributes and characteristics to a natural gum chicle.

One of the marked advantages of the composition hereinabove set forth is that its moisture content can be closely predetermined and thus due compensation made for conditions of humidity and temperature, and where such are used as hereafter set forth with reference to the amount of sugar, glucose, flavoring etc., employed. Other marked advantages, as compared with gum chicle for example, of my improved product is that it is clean, and being free from foreign matter is most hygienic, and does not require filtration or other purification, and that it can be produced and reproduced as a definite composition, whereas gum chicle differs from time to time in its various qualities, dependent in part upon the season, the source, its age, the methods of gathering, marketing, etc., employed.

My improved composition is neutral, inert, and sterile as it is made at relatively high temperatures and thus can be kept free from accidental impurities such as are obviously incident to natural gums, whether fossil or of current production.

In the practical use of my improved product, the base, preferably tempered as above set forth, may be used in a manner analogous to that used in connection with gum chicle in the manufacture of commercial chewing gum. Thus, for purposes of illustration, I cite a formula analogous to that known to those who are skilled in the art for the production of peppermint flavored chewing gum, viz:

| | Pounds |
|---|---|
| Base (tempered) | 20 |
| Powdered cane sugar | 65 |
| Glucose | 15 |
| Peppermint oil | ½ |

It is known to those who are skilled in the art that heretofore it has not been possible to produce chewing gum having a chocolate flavor for the reason that gum chicle, which is practically the only gum heretofore available for the commercial production of chewing gum possesses certain qualities, attributes and characteristics peculiar to it, but which are not ordinarily noticeable in the case of the ordinarily highly flavored commercial chewing gum. The two principal reasons for this are, on the one hand, that the presence of the fatty content contained in extracts of cacao renders the gum chicle both exceedingly sticky in the mouth, and of a soapy texture and feel, and on the other hand, owing to the presence of an aromatic principle which is peculiar to gum chicle and which, while readily and easily overlain by some of the more commonly used flavoring extracts such as the essential oils of spearmint, peppermint, yucca, licorice, wintergreen, tolu and the like in the case of the essential oil of cacao is accentuated to an extent that it itself not only overlies the chocolate flavor but becomes disagreeably dominating.

In my improved product, however, I attain an absolute blandness, inertness and neutrality in the base, and where I use a high rubber content (say twenty pounds as hereinbefore pointed out), I find that not only is such base free from the undesired characteristics of gum chicle with respect to flavor, but that such high rubber content enables the product to carry the fat content of cacao products, such as chocolate, without the undesirable stickiness and soapiness which has prevented satisfactory mastication in the endeavor to use chocolate with gum chicle.

Upon reflection, it will be readily appreciated that a chewing gum having a fat content, such as chocolate, requires a stiffer material and consequently more rubber than where a mere essential oil which is a relatively ethereal material is utilized for flavoring.

In the production of chocolate flavored chewing gum, which it is to be observed is a new article of manufacture, I may employ the following formula.

|  | Pounds |
|---|---|
| Base, at 140° C. (high rubber content, say 20 pounds rubber to 100 pounds paraffine wax) | 100 |
| Powdered cane sugar | 400 |
| Cocoa sirup | 80 |

In the production of cocoa sirup of a type suitable for use in connection with the foregoing formula, I preferably employ—

|  | Parts |
|---|---|
| Liquid cane invert sugar or honey | 100 |
| Dry cocoa powder | 25 |

The cocoa powder I find best suited for my present purposes is manufactured from the cacao beans, pressed dry, with the fat content reduced to substantially 22%. This material is finely ground until the mass is quite well disintegrated and the taste is mild and pleasant to the palate. The grinding is preferably carried on at about 60° C. in a conch or longitudinal machine, employing a stone roller and which may be heated conveniently by steam pipes.

The temperatures herein mentioned in the specification and in the claims, unless otherwise specified, are employed where the material is subject to atmospheric pressure. It will be understood, of course, that where temperatures are mentioned herein it is intended that different temperatures under pressures other than atmospheric be considered as equivalents.

Having thus described my invention and illustrated its use, what I claim as new and desire to secure by Letters Patent is:—

1. The process of rendering rubber tasteless, which includes the step of heating a composition of rubber and wax gradually to a temperature between limits of approximately 132° to 145° C.

2. As a new article of manufacture, a chocolate-flavored chewing gum formed from rubber, paraffine, and cocoa derivative.

3. As a new article of manufacture, a chocolate flavored chewing gum, including as ingredients thereof rubber, a wax, and a derivative of cocoa.

4. As a new article of manufacture, chewing gum comprising rubber and paraffin as a base, and sugar and a cocoa derivative as sub-basic elements.

5. The process of making the hereindescribed chewing gum base for obtaining a gum having plasticity, ductility and low resiliency characteristic of the masticatable properties of gum chicle which comprises gradually and progressively heating paraffin wax and rubber from 95° C. to about 170° C. under pressure conditions ranging from atmospheric to two atmospheres, the temperature being maintained intermediate the range with increased pressures.

6. The process of producing a chewing gum which includes preparing a base by gradually and progressively heating paraffin wax and rubber from 95° C. to about 170° C., under pressure conditions ranging from atmospheric to two atmospheres, the temperature being maintained intermediate the range with increased pressures, and tempering the above by the addition of a resinous material in proportions to obtain plasticity, ductility and low resiliency characteristic of the masticability of gum chicle.

7. The process of producing a chewing gum which includes preparing a base by gradually and progressively heating paraffin wax and rubber from 95° C. to about 170° C., under pressure conditions ranging from atmospheric to two atmospheres, the temperature being maintained intermediate the range with increased pressures and tempering the above by the addition of a resinous material and a bituminous hydrocarbon, amenable to admixture with a fatty, flavoring material comprising cocoa, the tempering materials being added in proportions to obtain plasticity, ductility and low resiliency characteristic of the masticability of gum chicle.

In testimony whereof I have hereunto signed by name.

CHARLES E. DELLENBARGER.